Alfred Simmon
INVENTOR.

BY Walter E. Wollheim
ATTORNEY.

May 17, 1949.

A. SIMMON

2,470,584

ILLUMINATING SYSTEM AND CONTROL DEVICE
FOR PHOTOGRAPHIC ENLARGERS

Filed June 20, 1947

Alfred Simmon
INVENTOR.

BY *Walter E. Wallheim*

ATTORNEY.

Patented May 17, 1949

2,470,584

UNITED STATES PATENT OFFICE 2,470,584

ILLUMINATING SYSTEM AND CONTROL DEVICE FOR PHOTOGRAPHIC ENLARGERS

Alfred Simmon, Jackson Heights, N. Y., assignor to Simmon Brothers, Inc., Long Island City, N. Y., a corporation of New York Application June 20, 1947, Serial No. 755,920

5 Claims. (Cl. 88—24)

This invention concerns improved means to change and control the light output of a photographic enlarger. It comprises in combination two principal parts, an illuminating system and a control device.

The illuminating system consists of a plurality of lamps, color filters of different colors for these lamps, and means to superimpose the light quantities transmitted by these filters upon each other so that mixtures of various colors can be obtained. In a preferred embodiment of this invention the filter means and the superimposing means are combined and are formed by so-called dichroic filter-reflectors.

The control device comprises preferably a number of rheostats, one in series with each light source, and a mechanism to actuate these rheostats in accordance with two independent factors or magnitudes. In a preferred embodiment of this invention this is effected by a set of movements which comprise each a pivoted lever in contact with a movable element of said rheostats and including independent means of changing the angle of this lever as well as the distance between the pivot point and the aforementioned contact.

While this invention can be used for a number of purposes, two preferred applications are for the contrast and intensity control for black and white prints, and for color correction purposes for color prints.

In the drawings,

Fig. 3 illustrates one of the control mechanisms including one rheostat;

Fig. 4 shows two shafts with eccentrics which form important elements of the mechanism illustrated in Fig. 3;

Fig. 5 shows schematically the arrangement of the device as adapted to contrast and intensity control;

Figs. 7 and 8 are graphs showing the light output under various conditions of the device shown in Figs. 1 and 5.

Figs. 9 and 10 are graphs showing the light output under various conditions of the device shown in Figs. 2 and 6.

Figure 1:
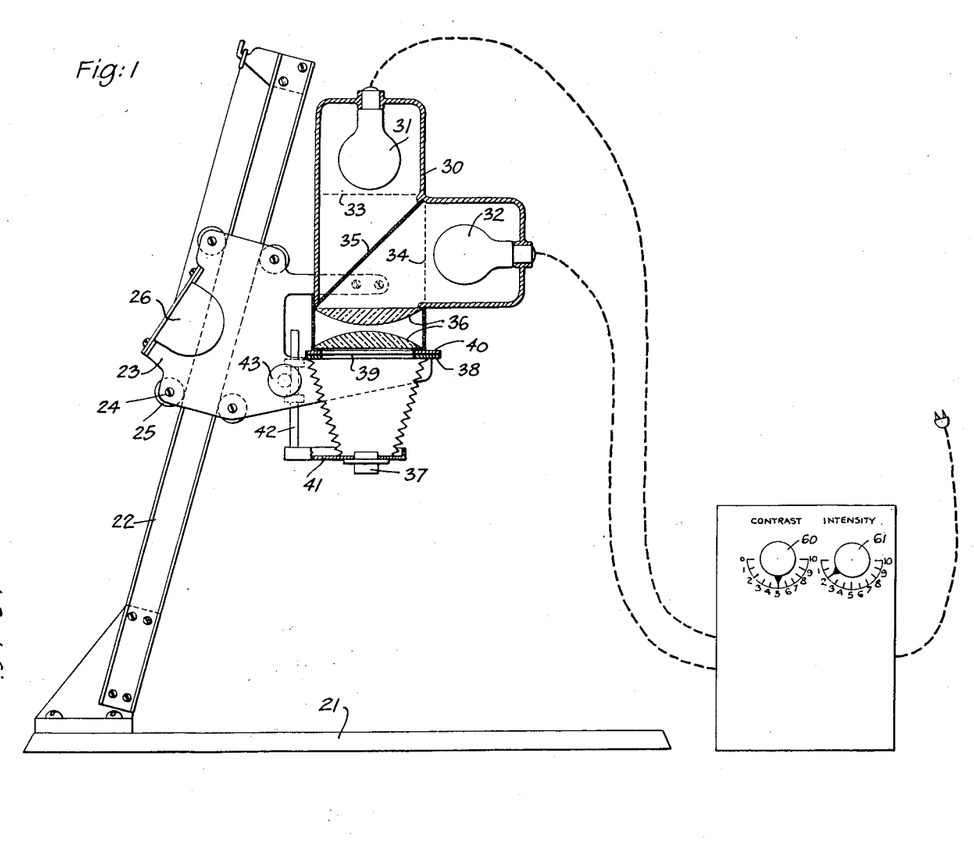
Fig. 1 shows, partly in cross-section, a typical enlarger built according to the principles of this invention and equipped for contrast and intensity control. It also shows the external appearance of the control device therefor.

A typical enlarger equipped with a representative type of light control according to this invention is shown in Fig. 1. This enlarger comprises a flat base 21, preferably made from plywood or the like, on which is mounted an upright support 22 either vertical or preferably slightly inclined as shown. During the exposure, a sheet of sensitized material is placed on this base. Slidably mounted on the support 22 is a projector carriage which usually comprises two flat steel plates 23 which are tied together by four studs 24. These studs serve at the same time as shafts for wheels or rollers 25 by means of which the projector carriage moves on the support 22. The entire projector carriage is counterbalanced by means of a spring 26 which is preferably of the type commercially available as sash weight balances.

The projector comprises the lamphousing, the focusing movement and the lens. The lamphousing consists of a casting or the like 30 which, in the example shown in Fig. 1, contains two lamps 31 and 32. Filters of different colors 33 and 34, shown in dotted lines, may be placed in front of the lamps, and an element 35 is provided by means of which the colored light quantities as transmitted by the filters can be superimposed upon each other. The optical system of the enlarger, in addition to the elements just described, consists of the conventional double condenser 36 and the equally conventional enlarging lens 37. A film stage 38 is provided upon which a negative 39 can be placed. This negative is preferably held in place by a negatve holder 40 which, in the usual manner, consists of two flat metal plates or the like with a suitable aperture. The film is sandwiched during the exposure between these flat metal plates. The lens 37 is fastened to a lens support 41 connected to one or, preferably, two guide rods 42. For focusing purposes the guide rods 42 and support 41 can be adjusted vertically so that the distance between lens 37 and film 39 may be adjusted until a sharp image of the film 39 is projected by the lens 37 on the base 21 upon which, in the usual manner, a piece of bromide paper or the like is placed. The focusing movement can be actuated by a handwheel 43 which, by means of suitable mechanism serves to move guide rods 42 vertically up and down. This mechanism has not been shown in detail since it does not form part of this invention, but it may, for example, be a rack and pinion movement.

The element 35, by means of which the two light beams emanating from lamps 31 and 32 can be superimposed is in its simplest form a half transparent mirror. Half transparent mirrors are well known in the art and have the property to transmit part of the light impinging upon them and to reflect part of the rest. A relatively high absorption loss is unavoidable, however.

In a preferred embodiment of my invention, the colored filters and the means to superimpose the light beams can be combined. In this case, the filters 33 and 34, shown in dotted lines, are omitted and the half transparent mirror is of a peculiar type known as a dichroic filter-reflector. These dichroic filter-reflectors consist of a sheet of transparent material, usually glass, which is coated on one or both sides with a number of thin transparent films. These films may be made from a variety of suitable materials, for example, cryolite, zinc sulfide or thorium oxi-fluoride. Interferences occur between the incoming and the reflected light beams and, by choosing the interference films of a proper thickness and from a suitable material, an incoming beam can be split in such a way that one part of the spectrum is reflected and the rest of the spectrum with practically no loss is transmitted. The optical efficiency of the dichroic filter-reflector is considerably better than the combination of colored filters and half transparent mirrors where the unavoidable loss of light is usually more than 50%.

The enlarger as shown in Fig. 1 can be used for the contrast control of black and white prints in connection with a variable contrast paper which has become commercially available. This variable contrast paper has the property to deliver very contrasty prints when exposed to blue light, but to give prints a low contrast after an exposure to yellow light. The dichroic filter-reflector 35 in this case should have the property to transmit blue light coming from lamp 31 and to reflect yellow light coming from lamp 32, assuming, of course, that both lamps emit substantially white light.

Figure 2:
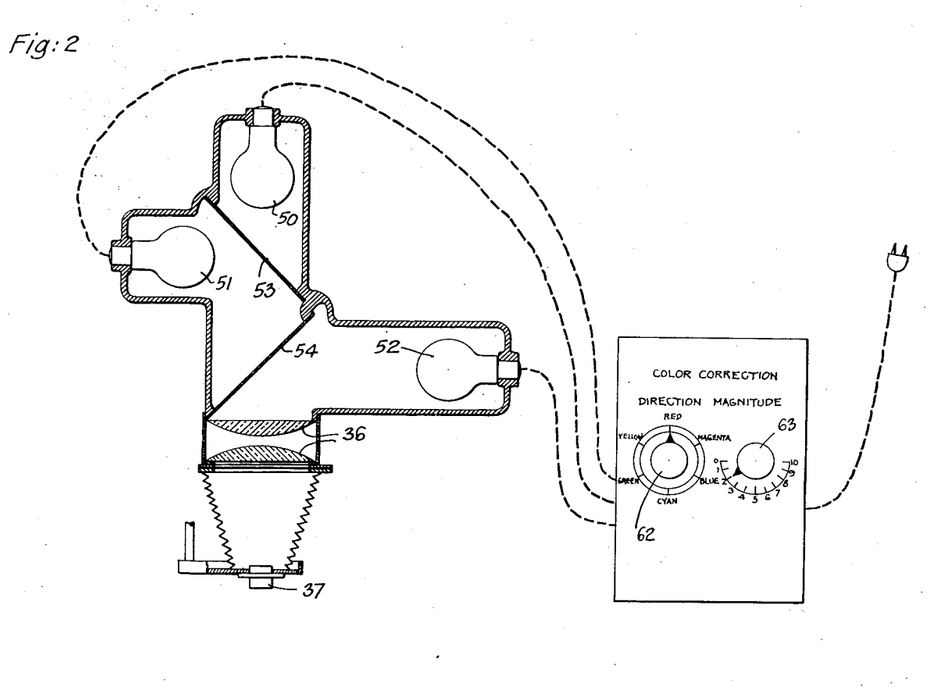
Fig. 2 is a cross-sectional view of the lamphousing of another enlarger as equipped for color correction of color prints, including the external appearance of the corresponding control.

Another example of an illuminating system built according to this invention is shown in Fig. 2. This particular system is adapted to be used for color correction purposes when making color prints. It comprises three lamps 50, 51 and 52, emitting substantially white light and two dichroic filter-reflectors 53 and 54. The rest of the optical system comprising condensers and enlarging lens is, of course, the same as described and shown in Fig. 1. For the purposes of color correction, it is desirable that each of the three lamps contribute light of one primary color. This can, for example, be achieved by choosing as element 54 a dichroic filter-reflector which transmits green and red light, but reflects blue, and by selecting as element 53 a dichroic filter-reflector which reflects green but transmits red light. In this manner red light coming from lamp 50 will be transmitted by both elements 53 and 54. Green light coming from lamp 51 will be reflected by element 53 and will be transmitted by element 54, and finally, blue light coming from lamp 52 will be reflected by element 54 so that light of all three primary colors originating, respectively, from all three lamps is directed into the condenser of the system.

The second principal part of this invention consists of the control system for the various lamps. It comprises a housing preferably of rectangular shape such as shown in Figs. 1 and 2, with a front panel having suitable scales and supporting two independent handwheels 60 and 61 in the case of Fig. 1, and 62 and 63 in the case of Fig. 2. Mounted within the housing are as many control units as there are lamps in the lamphousing, one mounted behind the other, and one of these control units is shown in detail in Fig. 3.

This unit comprises a flat base 70 which carries four stationary guide pins 71. Slidably mounted on these guide pins and capable of moving horizontally from right to left and vice versa is a rheostat support 72. This rheostat support carries a rheostat which consists of two principal parts, a resistor element 73 and a sliding contact element 74. The resistor element is manufactured from a flat sheet of insulating material which is, for reasons which will explained later, usually of trapezoidal shape, and has wound on it a relatively large number of turns of thin resistance wire. One end of this resistance wire is connected by a flexible insulated wire 77 to a binding post 76. The contact element 74 supports a contact 75 formed somewhat like a leaf spring made from suitable material such as phosphor bronze or beryllium copper. The contact element 74 with contact spring 75 is connected by a flexible insulated wire 97 to binding post 98 and fastened to a guide rod 78 preferably made from insulating material and, for example, of square cross-section. This guide rod 78 is adapted to move vertically and is supported by upturned lugs 79 and 80 which form part of the rheostat support 72. On its upper end guide rod 78 carries a guide pin 81 which can be actuated by a pivoted lever in a manner to be described immediately.

The rheostat as described can perform independently two movements. The rheostat support 72 can be moved horizontally and the guide rod 78 of the rheostat contact can be moved vertically. Two independent mechanisms are provided for these purposes. In order to move the rheostat support 72 horizontally, I use a mechanism consisting of a connecting rod 90, and a lever consisting of a long substantially vertical arm 92 and a short substantially horizontal arm 93 rotatably supported upon a pivot 91. Arm 93 is connected to a connecting link 94 which, in turn, is actuated by an eccentric disc 95 mounted on shaft 96.

As a mechanism to move guide rod 98 vertically, I use a pivoted lever 100 with an elongated slot 101 which engages the aforementioned guide pin 81. Pivoted lever 100 rotates on a pivot 102. The angle of lever 100 can be controlled by a connecting link 103 which, in turn, is actuated by another eccentric disc 104 mounted on a shaft 105. Theoretically the center line of slot 101 should pass the center of pivot 102, but a slight offset as shown has practical advantages and causes only a negligibly small error.

From Fig. 3 it will become clear that the relative position of contact 75 with respect to resistor 73 can be adjusted independently by rotating either of the two shafts 96 or 105. Rotating shaft 105 will swivel lever 100 around pivot 102 and, therefore, move directly pin 81 and guide rod 78 vertically. Since the contact element 74 with contact 75 is fixedly fastened to guide rod 78, they will participate in this vertical movement. Rotation of shaft 96 will swivel the two arms 93 and 92 of the lever pivoted on pivot point 91 and will, consequently, by means of connecting link 90, move rheostat support 72 horizontally either to the right or to the left. This, in turn, will cause a movement of pin 81 in slot 101 and thereby a vertical movement of guide rod 78 relative to resistor 73, provided that the elongated slot 101 of lever 100 is in any position other than parallel to the direction of movement of rheostat support 72. If both shafts 96 and 105 are turned, the relative movement of contact 75 with respect to resistance 73 will be in accordance with the product of the adjustments caused by the rotary movements of both shafts since both the angle of lever 100 and the distance of guide pin 81 from pivot 102 are changed.

As has been pointed out before, a number of control units as shown in Fig. 3 are combined and are mounted in a housing such as shown in Figs. 1 and 2. The control units are mounted one behind the other and all the eccentrics corresponding to element 104 are mounted on a common shaft 105 and all the eccentrics corresponding to element 95 are mounted on a common shaft 96. On one of these shafts the eccentrics, are mounted out of phase with each other, i. e., they are angularly displaced relative to each other and the angle between adjacent eccentrics equals 360° divided by the number of light sources for which this particular control happens to be designed. On the other shaft, all eccentric discs are mounted in phase, i. e., lines connecting the center of the shaft and the center of the various eccentric discs are parallel. In Fig. 4 the upper shaft carries three eccentrics which are out of phase with each other and the lower shaft carries three eccentrics which are in phase with each other. It is immaterial which of the two assemblies is used for the left movement, shaft 105, or the right movement, shaft 95, since the relative displacement of contact 75 and resistor 73 is in accordance with the products of the adjustments caused by the two shafts, and the two shafts are, therefore, interchangeable as far as their positions are concerned. I wish to emphasize that the broad principle of having one set of adjustments actuated simultaneously and out of phase with each other and the other set of adjustments actuated simultaneously and in phase with each other is one of the most important features of the instant invention. The results and advantages of this arrangement can best be realized by contemplating the two most important applications to which this invention may be put and which are illustrated in Figs. 5, 7, 8 and 6, 9, 10, respectively.

Fig. 5 shows schematically a contrast and intensity control as built according to this invention. The illuminating system is shown schematically and is the same as the one shown in Fig. 1, consisting of the two lamps 31 and 32 and the dichroic filter-reflector 35. Two control units built according to Fig. 3 are shown and, while they are schematically shown one above the other, they are in reality mounted one behind the other. The two eccentrics 104 and 104' are mounted on a common shaft 105 and are out of phase with each other, the angular displacement being 360° divided by two, or 180°. The two other eccentrics 95 and 95' are mounted on a common shaft 96 and are in phase with each other. The length of connecting elements 103 and 103' which are actuated by eccentrics 104 and 104' is so chosen that in the extreme position, as illustrated by the control unit shown on top of the drawing, lever 100' assumes a horizontal position, i. e., parallel to the direction of movement of rheostat support 72'. Of course, after rotating shaft 105 by 180°, lever 100' will assume a position now assumed by lever 100 and vice versa. The distance between contact 75 and pin 81 or, what is the same, between contact 75' and pin 81', is so chosen that when lever 100 or 100' assumes a vertical position, contact 75 or 75' is at the lowest point of resistor 73 or 73', respectively, i. e., the intensity of the lamp controlled by this particular rheostat is then at a minimum.

The resistance element 73 and 73' must be so dimensioned that the light output of the lamps becomes a linear function of the displacement of the contact 75 or 75' with respect to the resistor 73 and 73'. Light intensities are, for the purpose of the following discussion, always assumed to be expressed in terms of their respective photographic effects, i. e., two light intensities of different colors are considered equal if they cause the same print density on the photographic medium that is being used. This means that the resistance per unit length of the resistance elements 73 and 73' must change from one end to the other, and that the resistance per unit length in the neighborhood of the upper end of these resistors must be much lower than in the neighborhood of the lower end. This can be achieved by the combined application of two expedients: First, by making the supporting strip for the resistors which is made from insulating material trapezoidal, i. e., wider at the lower end; and second, by winding the wire with a variable pitch, the windings being quite close to each other at the lower end, but relatively far apart at the upper end. By combining these features, almost any attenuation may be obtained within wide limits, and it is not difficult to proportion the resistor element in such a way that the light output of the lamps becomes a linear function of the displacement of the rheostat contact with respect to the resistor.

Due to the fact that the color temperature of a tungsten filament lamp decreases quite rapidly when a resistor is applied, the quantity of the light transmitted through the red filter, for example, will decrease much less rapidly than the light output transmitted through a blue filter and, therefore, the resistor elements of the various rheostats will not be interchangeable, but will be proportioned in different ways so that the light output of the various lamps as transmitted by their respective filters changes in the same ratio. In the example shown in Fig. 5, lamp 31 contributes blue light to the eventual color mixture to which the print is exposed and, therefore, resistor element 73' has a relatively low total resistance. Lamp 32 contributes yellow light, i. e., its light output is closer to the red end of the spectrum and, therefore, resistor 73 has a higher total resistance. The light outputs of both lamps must undergo the same changes when the contacts 75 and 75', respectively, are moved by the same distance relative to their respective resistor elements 73 and 73'.

These resistors are in this particular case so dimensioned that at the lowest position, i. e., in the one assumed in Fig. 5 by contact 75', the light output of the lamp through its particular color filter becomes zero or very nearly zero. For this purpose, it is not necessary to reduce the voltage to zero but it is usually sufficient to reduce the voltage to approximately ⅓ of the normal or line voltage. In other words, in the position as shown, the blue light emitted by lamp 31 would be substantially zero because contact 75' is at the lowest point of resistor 73'. On the other hand, in the position shown, the yellow light output of lamp 32 would be approximately 75% of the full output because the distance of contact 75 from the lower end of resistor 73 equals approximately 75% of the total length of resistor 73. In the interest of clarity, I have shown two scales calibrated from zero to 100 to the left of each rheostat, and the relative light output of the corresponding lamps 31 and 32 is indicated on these scales by the relative positions of contacts 75 and 75'.

In Figs. 7 and 8 I have plotted the yellow and blue light values of lamps 31 and 32 as the function of angle $\alpha_1$. This angle is shown at the lower unit of Fig. 5 and it represents the angle between a horizontal line and the center line of the eccentric disc 104. The corresponding angle $\alpha_2$ of eccentric disc 104' is simply $\alpha_1 + 180°$. The angles of the eccentric discs 95 and 95' are of course, alike, i. e., $\beta_1 = \beta_2$. Fig. 7 is plotted under the assumption that $\beta_1 = \beta_2 = 0$. In this case the two rheostat supports 72 and 72' are shifted as far to the left as possible and any displacement of the rheostat contacts is, therefore, as large as it can be for the corresponding angles that levers 100 or 100' may assume. As shown in the graph of Fig. 7, for $\alpha_1 = 0$, I have a 50–50 mixture of yellow and blue light. If I increase $\alpha_1$ the yellow light increases until it becomes a maximum at 90° and at the same time the blue light becomes zero, i. e., I have now entirely yellow light. Further rotation of shaft 105 with the eccentrics 104 and 104' increases the yellow and decreases the blue light until at 180° I have a 50–50 mixture again. The conditions from now on are reversed, i. e., the blue light becomes stronger than the yellow, until at 270° I have blue light only, the yellow light being zero. The total intensity of yellow + blue light is at all times constant. From the graph in Fig. 7 it becomes obvious that in this particular case the movement of shaft 105 can be restricted to 180° since any additional adjustment will merely cause repetitions. For example, if I have $\alpha_1 = 90°$ in one extreme position and in the other extreme position $\alpha_1 = 270°$, all possible color mixtures can be obtained.

In Fig. 8 I have shown the same conditions, but instead of $\beta_1 = 0$, I have assumed that shaft 96 has been rotated 90° or that $\beta_1 = 90°$. The result of this adjustment would be that rheostat supports 72 and 72' will not assume their positions to the extreme left but the distance between points 81 and 102, and 81' and 102' will be half of their maximum distance. In this position a rotation of shaft 105 will have the same effect as before and as shown in Fig. 7, but the amplitude of the curves denoting light values will be half as high. In other words, the color mixture will not be affected; it will again be entirely yellow at 90°, 50–50 at 180°, and entirely blue at 270°, but the yellow value at 90° will equal half the yellow value shown in Fig. 7, and the blue value at 270° will equal half the blue value shown in Fig. 7. By continuing the rotation of shaft 95, I can, as an extreme example, make $\beta_1 = 180°$ in which case the amplitudes of both the yellow and the blue light values would be zero.

Generally, it can be seen that the rotation of shaft 105 causes a change in color composition without a change in total light intensity, whereas a rotation of shaft 96 causes an adjustment of total intensity from zero to a maximum without affecting the color mixture. In other words, I can now use this arrangement for the independent control of light intensity, shaft 96, and of contrast, shaft 105. It must be remembered that, when using variable contrast paper, contrast is a function of color mixture.

The external appearance of a control unit incorporating contrast and intensity control is shown in Fig. 1. Handwheel 60 actuates shaft 104 and cooperates with a dial extending over 180° and indicating contrast in 10 arbitrary steps. Handwheel 61 actuates shaft 96 and cooperates with the second dial extending over 180° and indicating total light intensities in 10 arbitrary steps.

A modification of this arrangement which could under certain circumstances become valuable may comprise the replacement of the manually controlled handwheel 61 controlling the total light intensity by a cam operated mechanism to control the intensity of the light as a function of the distance of the projector or, more accurately, of the film stage 38 from the support or easel 21, in such a way that the light intensity impinging upon said easel remains constant for all magnification ratios of the enlarger. This arrangement has not been shown in the drawings since it does not form part of this invention and since the broad idea of actuating a rheostat as a function of the projector to easel distance, in order to keep the light output of an enlarger constant, is well known in the art.

Figure 6:
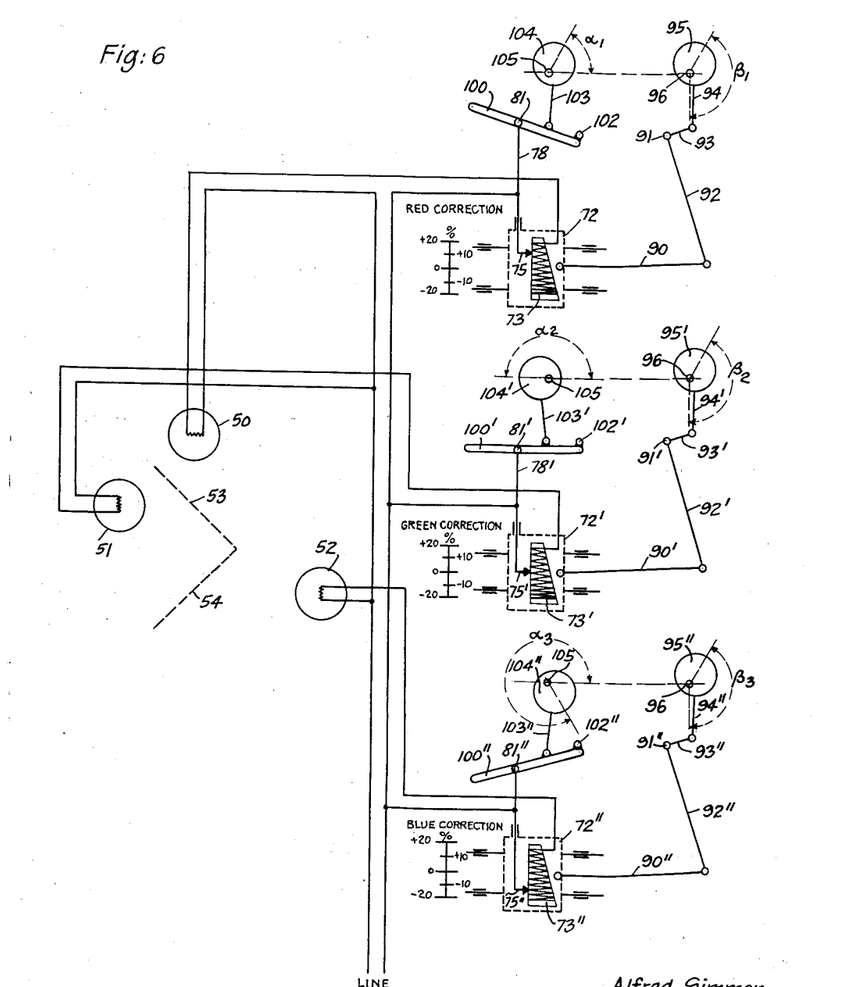
Fig. 6 shows schematically the arrangement of the device as adapted for color correction for color prints.

An arrangement by which an illuminating system and a control device built according to this invention can be used for color correction purposes when making color prints is schematically shown in Fig. 6. It is assumed that the color prints made with the enlarger built according to this invention are made on color print material of the so-called monopack type. Color print material of the monopack type comprises a support usually made from white paper or the like on which a number of sensitive layers are coated. These layers, after exposure, are processed in a suitable way so as to produce in superposition, and in register with each other, three colored images. When making these color prints, it is usually necessary to modify the substantially white light of the enlarger to a relatively small extent only in order to compensate for deficiencies of the transparencies from which the color print is made, or for deficiencies of the color print material on which the print is made. For example, instead of pure white light, a slight reddish tint may be necessary, or for some other print this color correction should render the originally white light slightly blue, but the blue deviation may be somewhat more intense than the red deviation required for the previous print. In other words, the color correction must be adjustable according to two factors which I call the "direction" and "magnitude" of the color correction. By "direction" I mean in this case the predominant color toward which the light output of the enlarger must be shifted. This predominant color may be any of the primary colors such as red, blue and green, or any mixture of two of these colors. The second factor is the "magnitude" of the color correction, i. e., the red tint, for example, may be more or less intense.

The illuminating system schematically shown in Fig. 6 is identical with the one shown in Fig. 2. Lamp 50 contributes red, lamp 51 green, and lamp 52 blue light. The dichroic filter-reflector 53 reflects green but transmits red light, and the dichroic filter-reflector 54 transmits green and red and reflects blue light. The intensity of the lamps is, respectively, controlled by three rheostats, i. e., the intensity of the red light, lamp 50, depends upon the relative position of contact 75 and resistor 73, the intensity of the green light, lamp 51, depends similarly upon the relative position of contact 75' and resistor 73', and finally the blue light contributed by lamp 52 depends upon the relative position of contact 75'' and resistor 73''.

The three resistors are not interchangeable since the blue filter output of lamp 72 upon addition of resistance decreases relatively rapidly because of the change of color temperature towards the red and, therefore, the resistor 73'' has a relatively low value. The resistor 72' has a larger value because the green light contributed by lamp 51 decreases a little less rapidly when the color temperature is changed, and the resistor 73 which controls the red light contributed by lamp 50 must be relatively high because the red light output of an incandescent lamp declines much more slowly and, therefore, a more drastic change of resistance is required for the same change in light output.

It is in this case not necessary to have the resistors so dimensioned that at the lowest point the output of the lamp actually declines to zero. The transparencies from which color prints are made are always at least nearly perfect and require, therefore, only a relatively small color correction. For this reason, as an example, I have assumed that a correction of one of the three primary colors of plus or minus 20% is sufficient; as a matter of fact, it sometimes may be possible to obtain satisfactory results within a much smaller range of correction.

The lengths of the connecting links 78, 78' and 78'', i. e., the respective distances between points 81 and 75, 81' and 75' and 81'' and 75'' are so dimensioned that the contacts 75, 75' and 75'' are in the center of their respective resistors 73, 73' and 73'' when the actuating levers 100, 100' and 100'' assume a horizontal position, i. e., parallel to the direction of movement of the rheostat supports 72, 72' and 72''. The control unit for the green lamp, i. e., lever 100' is shown in this position. In this position the output of the lamp controlled by this particular rheostat is of a "normal" value or I shall assume that in this position its light output is 100 units. With the contact 75, 75' or 75'' at the upper end of their respective resistors 73, 73' and 73'', the light output of the respective lamps will be 20 units larger than normal and with the three contacts at the lower end of their respective resistors the light output of the respective lamps will be 20 units smaller than normal. For convenience, I have shown three scales to the left of the three rheostats. The position of the contacts 75, 75', 75'' relative to this scale may serve as an indication of the relative magnitude of the color correction to which each individual lamp has been adjusted.

As explained in the previous example, the three resistor elements are wound so that they cause the colored light output of their respective lamps to change in linear proportion to the displacement of the sliding contacts relative to their resistor elements. This is done by the same expedient as described above, i. e., a combination of trapezoidal shape of the insulating strip on which the resistance wire is wound and by choosing a suitable variable pitch for the windings of the resistance wire.

I have plotted in Figs. 9 and 10 the light intensities for the three lamps as obtained by the device under various conditions. In Fig. 9 I have assumed $\beta_1 = \beta_2 = \beta_3 = 0$, i. e., in this case the supports for the three rheostats 72, 72' 72'' are shifted as far to the left as possible, and any displacement of the respective rheostat contacts relative to their resistor elements will be at a maximum for a given angle for the three levers 100, 100', and 100''. In the case shown by lever 100', i. e., when this lever is parallel to the direction of movement of the rheostat support 72', any shift of the rheostat support 72' to the right or left will, of course, not change the setting of the rheostat. This simply means that in this case one of the two factors determining the light output of the lamp, 52 in this instance, is zero, in which case the magnitude of the other factor does not affect the result, which remains zero.

Fig. 10 differs from Fig. 9 by virtue of the fact that $\beta_1 = \beta_2 = \beta_3 = 90°$ has been chosen. This means that the three rheostat supports 72, 72' and 72'' assume positions halfways between the extreme left and the extreme right positions. The effect is that the amplitudes of the curves plotted for the various light values will be half as high as the maximum amplitudes shown in Fig. 9. In both figures the light intensities in the three primary colors are plotted in three curves as functions of the angle $\alpha_1$. This angle denotes the angle of the eccentric 104 of the control unit shown at the top of Fig. 6. The two other angles for the eccentrics 104' and 104'' are, of course $\alpha_2 = \alpha_1 + 120°$ and $\alpha_3 = \alpha_1 + 240°$.

The absolute light values for the three primary colors can be read on a scale on the left side of the graphs in Figs. 9 and 10, and the color corrections, i. e., the deviations from 100% for the three primary colors, can be read on a smaller scale on the right side of Fig. 9 and 10, respectively. These last named scales are the same as the scales shown in Fig. 6. It can be seen that the red light, for example, assumes a maximum value, in the case of Fig. 9, of 120 units for $\alpha_1 = 90°$, and declines to a minimum of 80 units for $\alpha_2 = 270°$. The corresponding color corrections for 90° and 270° are, of course, plus or minus 20%. The conditions in Fig. 10 are similar except that the amplitude of the color correction curve is half as high, i. e., the red light value for 90° is 110 units, and for 270° is 90 units, or the color correction fluctuates between plus or minus 10%. The conditions for the two other primary colors are identical except that they have a phase shift with respect to the red color and, of course, with respect to each other. For example, the green light value is at a minimum at 30° and a maximum at 210°, and the blue light value is at a minimum at 150° and at a maximum at 330°. Again, the amplitude of the color correction, i. e., the amount of deviation from the normal or 100% is twice as high in the case of Fig. 9 as in the case of Fig. 10.

It can be seen that the three light values constitute a three phase system which has some of the properties of three phase systems used in electrical engineering. The most notable characteristic is the fact that the sum of all three color corrections and therewith the sum of all three light values for any given value of $\alpha_1$ remains constant. For example, for $\alpha_1 = 90°$ we have a red value of 120 units and a blue and green value of 90 units each, the sum being 300 units. For 150° we have a red and green value of 110 units each and a blue value of 80 units, the sum again being 300 units. The same figures for the sum of all three components can be computed in the case of Fig. 10, and the sum of all three components is always constant, i. e., 300 units.

It can be observed that a rotation of shaft 105 with eccentrics 104, 104', and 104'' will change the predominant color correction. For $\alpha_1=30°$ both the red and the blue light are above and the green light is below the average value and, therefore, the enlarger produces light of a magenta tint. For $\alpha_1=90°$ the red output is above, and the green and blue outputs are below normal, or the light output of the enlarger will have a distinct red tint. For 150° the red and green outputs will be above and the blue output will be below normal, or the light output of the enlarger will appear yellow. At 210° the correction will be towards the green, at 270° it will be cyan, and at 330° it will be blue. In other words, the rotation of shaft 105 will steplessly adjust the direction of the color correction so that a shift towards any desired color can be obtained.

The rotation of shaft 96 with eccentrics 95, 95', and 95'' will cause the three rheostat supports 72, 72' and 72'' to move horizontally in unison and thereby change simultaneously the amplitude of all three correction curves as shown for two respective values of $\beta_1$ in Figs. 9 and 10. One extreme case, i. e., $\beta_1=0$ is shown in Fig. 9. The other extreme case would be $\beta_1=180°$. In this case the amplitude of all three corrections would be zero, or the light output of the enlarger would be entirely uncorrected white light. This adjustment would, for example, be indicated for a color transparency which is in perfect balance and for a color print material which is also in perfect balance, and while such case, at the present time, appears to be rare, it is nevertheless possible.

The schematic representation in Fig. 6, together with the graphs in Figs. 9 and 10 explain, therefore, how a device built according to this invention can be used to adjust independently the direction and the magnitude of the color correction. The external appearance of such a control device is shown in Fig. 2 where I have two hand-wheels 62 and 63 which operate the shafts 105 and 96, respectively. Handwheel 62 cooperates with a dial which extends over 360° and which indicates the predominant color toward which the color output of the enlarger is being shifted. Handwheel 63 actuates shaft 96 and cooperates with a dial extended over 180° and indicating the magnitude of the color correction which, in this case, is arbitrarily divided into 10 equal divisions. The zero value corresponds to a zero amplitude of the three direction curves as shown in Figs. 9 and 10, i. e., to pure white light. As an example, for instance, a color print may need a red tint instead of pure white light and this red tint may have to be of a rather moderate intensity. Such an adjustment is shown in Fig. 2.

This description discloses fully the construction, working function and principal applications of the present invention. It is understood that many modifications may be made without departing from the spirit of this invention and the scope of the appended claims. For example, while I have consistently shown two shafts with eccentric discs of which one carries the eccentrics out of phase with each other while the other carries them in phase with each other, only the first one is really necessary. The shaft with the eccentric disc in phase with each other can be replaced by one of many other simple movements, for example, by a rack and pinion drive which may actuate all three rheostat supports simultaneously. Instead of a shaft having a number of eccentrics many obvious mechanical equivalents can also be used.

What I claim as new is:

1. In combination, an illuminating and a control device for photographic enlargers, said illuminating device comprising a plurality of light sources, filters of different colors for said light sources, and means to superimpose the light quantities transmitted by said filters upon each other, said control device comprising means to adjust the intensity of each light source, a first mechanism, and a second mechanism, said means to adjust the intensity of each light source comprising a plurality of rheostats, one in series with each light source and each comprising a support, a resistor element and a sliding contact element in current conducting relationship therewith, one of the two last named elements stationary relative to said support, and the other one movable relative to said support and to said stationary element, said first mechanism comprising a first set of manually and simultaneously operated driving movements and a first set of elements driven thereby, said driven elements comprising a plurality of pivoted levers, each having a pivot point and a point of contact with one of the relatively movable elements of one rheostat, respectively, whereby an operative relationship between said lever and said movable rheostat element is established, and said first set of driving movements comprising means to adjust the angle of said levers by rotating them on their respective pivot points, whereby said levers may assume all possible positions between two extremes, said second mechanism comprising a second set of manually and simultaneously operated driving movements and a second set of elements driven thereby, said last named driven elements being formed by said aforementioned rheostat supports, and said second set of driving movements adapted to move said supports in a substantially straight line parallel to one of the possible positions of said levers and substantially at right angles to the direction of movement of one rheostat element relative to the other, whereby the distance between the respective pivot points and contact points may be adjusted, and whereby the relative displacement of said two elements of each rheostat is rendered proportional to the product of the angular adjustment effected by said first mechanism and the straight line adjustment effected by said second mechanism, the driving movements of one set being in phase with each other, whereby the displacement of all corresponding driven elements is changed in the same ratio, and the driving movements of the other set being out of phase with each other, whereby an harmonic motion is given to the corresponding driven elements, the sum of their displacements being constant.

2. A device according to claim 1, said last named set of driving movements comprising a rotatable shaft with a plurality of eccentrics and an equal number of connecting links, actuated by said eccentrics and actuating the driven elements of said mechanism, the number of said eccentrics equalling the number of light sources, and said eccentrics angularly offset with respect to each other, the angle between adjacent eccentrics being 360° divided by the number of light sources.

3. A device according to claim 1, modified for the control of contrast of black and white prints made on photographic paper of the variable contrast type, comprising two light sources, two rheostats adapted to control the intensity of said light sources, respectively, from a maximum value to substantially zero, and the relative arrangement of said levers and said rheostats, whereby each of said levers in one extreme position is parallel to the direction of movement of said rheostat supports, and whereby at the same time the resistance of said rheostat becomes a maximum, whereby the one mechanism which comprises the set of driving movements which are out of phase with each other adjusts the contrast of the print by changing the color composition of the light to which said print is being exposed, without affecting the total intensity of said light, and whereby the other mechanism which comprises the set of driving movements which are in phase with each other adjusts the total intensity of the light without changing its color composition.

4. A device according to claim 1, modified for the correction of color of color prints made on monopack color print material, comprising three light sources, three filters substantially of three primary colors, three rheostats adapted to control the intensity of said light sources, respectively, from a maximum to a minimum value, said maximum intensity being larger than a "normal" intensity by a given magnitude, and said minimum value being smaller than said "normal" intensity by the same magnitude, the relative arrangement of said levers and said rheostats whereby each of said levers in a position halfway between its two extreme positions is parallel to the direction of movement of said rheostat supports and whereby at the same time said rheostat adjusts the light source controlled by it to said "normal" intensity, whereby the one mechanism which comprises the set of driving movements which are out of phase with each other adjusts the predominant color of a desired color correction, without affecting the magnitude of said correction, and whereby the mechanism which comprises the set of driving movements which are in phase with each other adjusts the magnitude of a desired color correction, without affecting the predominant color of said correction.

5. A control device for the illuminating system of a photographic enlarger, said illuminating system comprising a plurality of light sources, filters of different colors for said light sources, and means to superimpose the light quantities transmitted by said filters, upon each other, said control device comprising a plurality of adjusting means, equal in number to the number of said light sources, each adapted to adjust the intensity of one light and each comprising two parts displaceable relative to each other, two mechanisms controlling said adjusting means, and operatively connected to said displaceable parts, the first mechanism comprising members operatively connected with each other and equal in number to the number of said light sources, adapted to adjust simultaneously the displacement of said two parts of all adjusting means, said members having a phase shift relative to each other of 360° divided by the number of said light sources, the second mechanism comprising means to change all displacements, as adjusted by the first mechanism, simultaneously and in the same ratio, including means under the control of the operator adapted to change said ratio, whereby said first mechanism changes the ratio of said displacements relative to each other, while keeping their total sum constant, and whereby said second mechanism changes the total sum of said displacements, while keeping their ratio relative to each other constant.

ALFRED SIMMON.

REFERENCES CITED

The following references are of record in the file of this patent:

UNITED STATES PATENTS

| Number | Name | Date |
| --- | --- | --- |
| 2,346,988 | Noel | Apr. 18, 1944 |
| 2,392,502 | Potter | Jan. 8, 1946 |